United States Patent Office 2,764,897
Patented Oct. 2, 1956

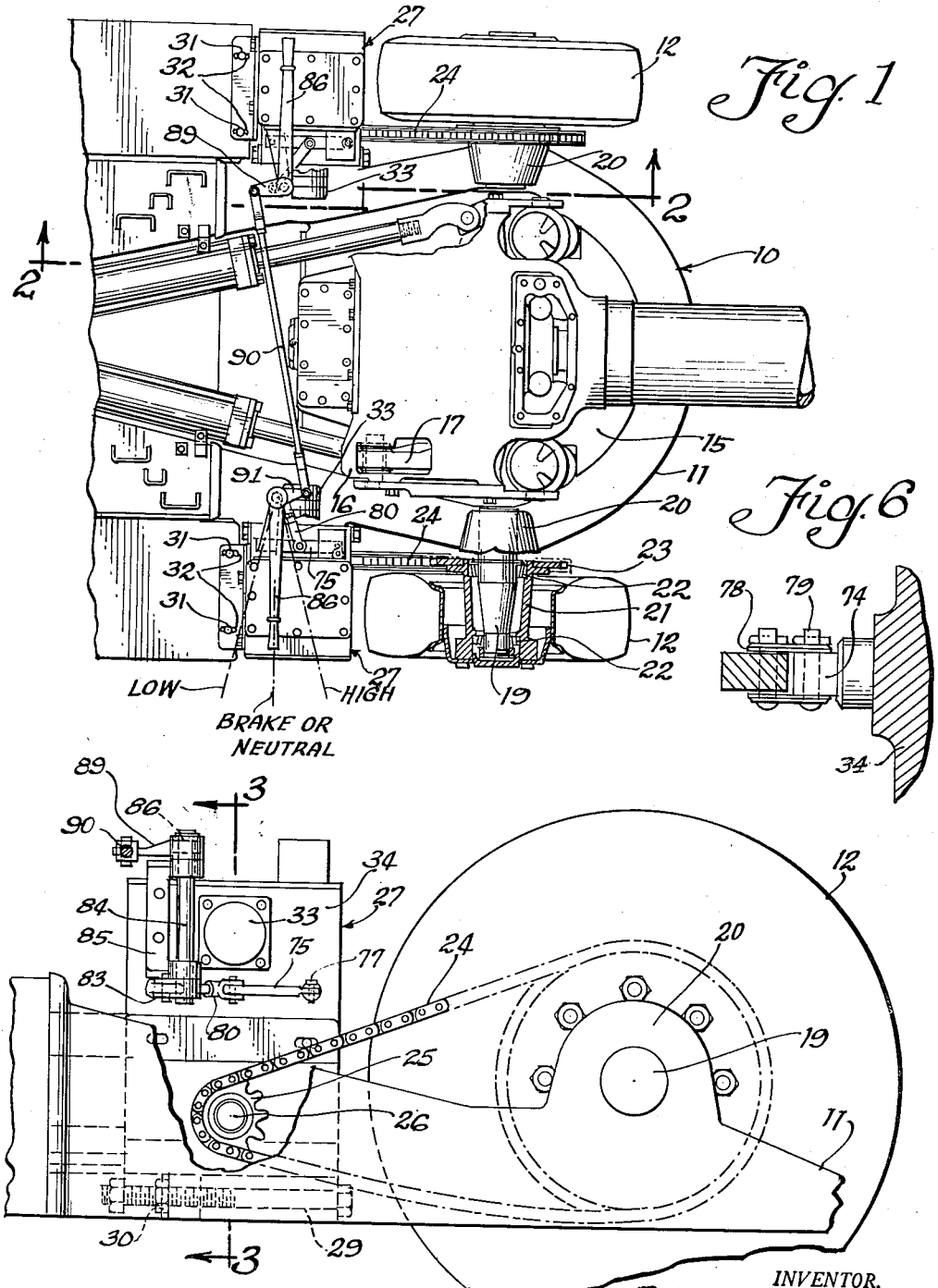

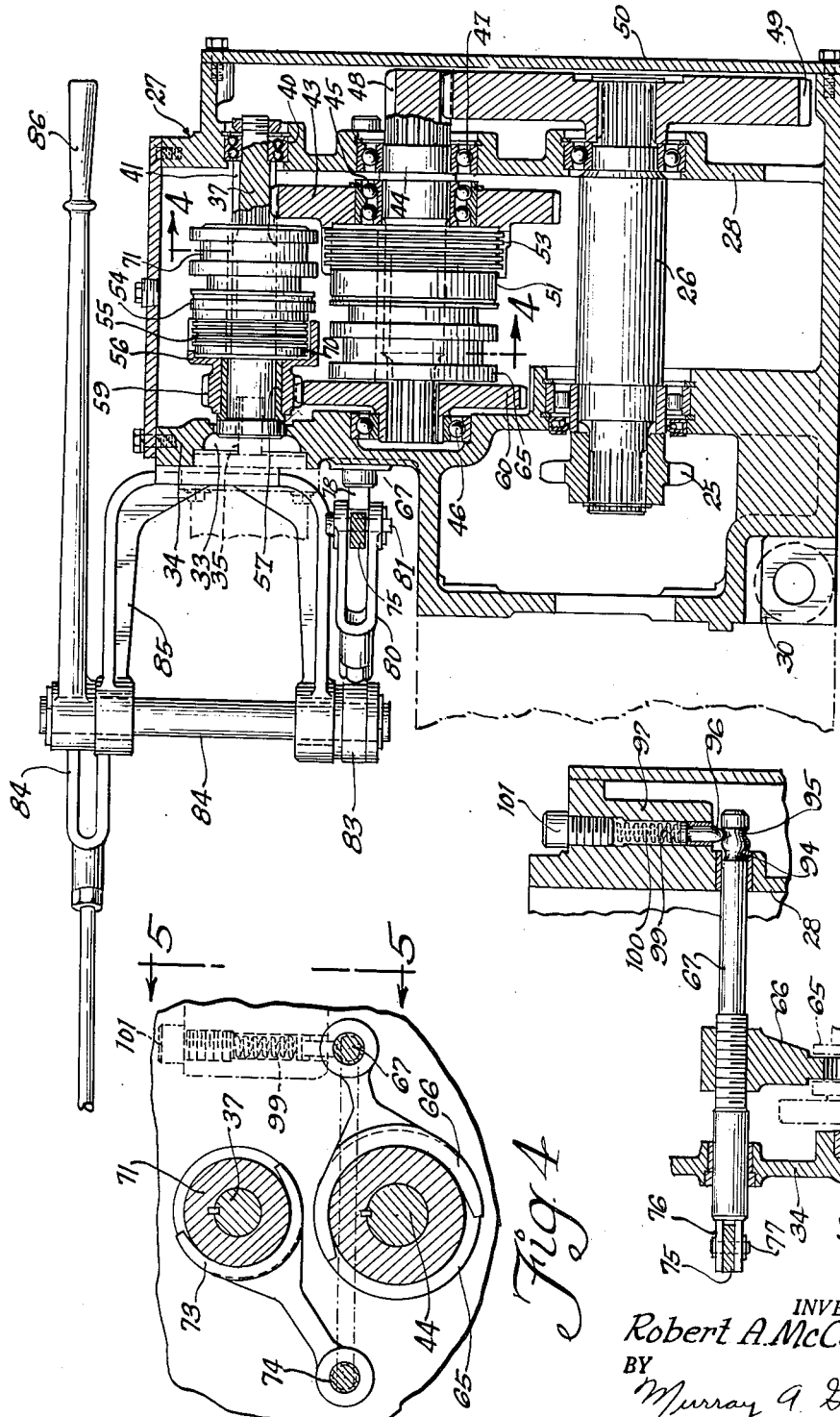

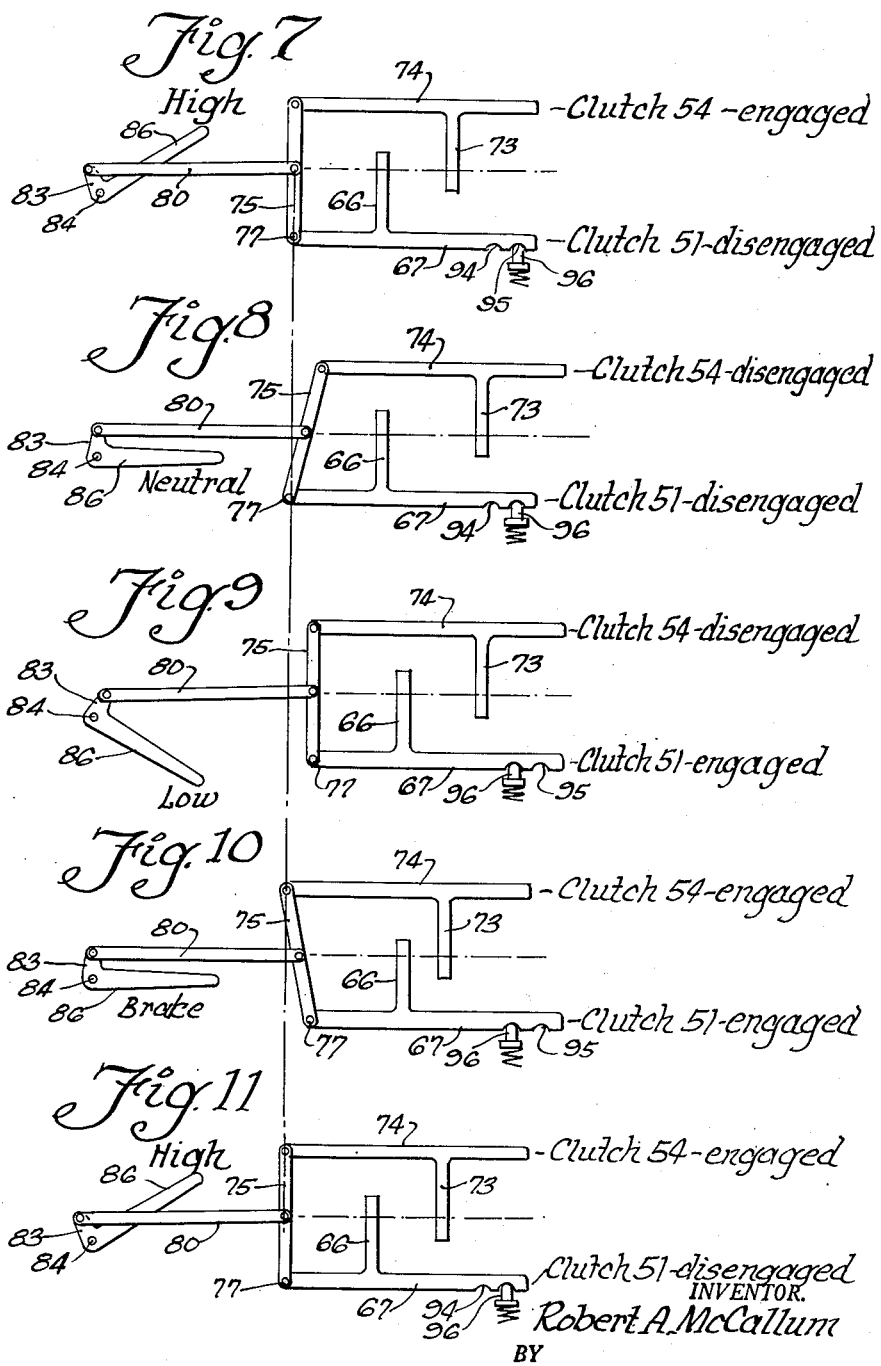

2,764,897

VEHICLE TRAMMING SPEED CONTROL MECHANISM

Robert A. McCallum, Clarendon Hills, Ill., assignor to Goodman Manufacturing Company, Chicago, Ill., a corporation of Illinois Application October 21, 1952, Serial No. 316,046

11 Claims. (Cl. 74—359)

This invention relates to improvements in speed changing controls and braking means for vehicles, and more particularly relates to such controls particularly adapted to control the speed changes and braking of kerf cutting machines operable in confined spaces underground, such as mines.

A principal object of my invention is to provide a new and improved tramming speed control for a vehicle, wherein a change in speed and braking may be effected from either side of the machine.

A further object of my invention is to provide a simple and novel control means for changing the tramming speeds of a vehicle, wherein the change in speed may be effected from either side of the machine by operation of either one of two hand control levers, one being positioned at each side of the machine.

A still further object of my invention is to provide a simple and efficient control for a hydraulically trammed vehicle such as a kerf cutting machine operable in mines underground and having a change speed transmission, wherein a single control lever at each side of the machine may be operated to change the speeds of the transmission and the tramming speeds of the vehicle.

Another and more detailed object of my invention is to provide a novel and improved form of control for vehicles utilizing individual hydraulic motor devices and plural speed transmissions driven therefrom for driving each traction wheel of the vehicle, together with means for shifting the speeds of the transmission devices and braking the vehicle by operation of one of two shifting levers positioned at opposite sides of the machine.

Still another object of my invention is to provide a novel and improved form of tramming speed control for a vehicle, wherein individual hydraulic motor devices and plural speed transmissions driven therefrom are provided to drive each traction wheel, and wherein the transmissions are simultaneously shifted by operation of a single shifting lever effecting a high speed drive when moved to one side of a neutral position, a low speed drive when moved to the other side of a neutral position and braking the vehicle when moved from a low speed drive back toward a neutral position.

Still another object of my invention is to provide a novel and improved kerf cutting machine of the wheel mounted type, utilizing individual hydraulic motor devices and plural speed transmission devices for tramming the vehicle, with individual shifting devices associated with each plural speed transmission device to attain a high and a low speed and to hold the vehicle from movement, together with interconnected operating levers for shifting the transmission devices from either side of the machine.

These and other objects of my invention will appear from time to time as the following specification proceeds and with reference to the accompanying drawings wherein:

Figure 1 is a fragmentary plan view of the forward end portion of a wheel mounted kerf cutting machine with certain parts broken away and certain other parts shown in horizontal section in order to illustrate one form in which my invention may be embodied;

Figure 2 is a fragmentary sectional view of the front end portion of the machine shown in Figure 1 looking generally along line 2—2 of Figure 1;

Figure 3 is a transverse sectional view taken through one of the transmission devices for driving one of the tramming wheels and looking generally along line 3—3 of Figure 2;

Figure 4 is a fragmentary sectional view taken substantially along line 4—4 of Figure 3;

Figure 5 is a fragmentary sectional view taken substantially along line 5—5 of Figure 4;

Figure 6 is a detail view illustrating a detail of construction of the operating means for one clutch; and Figures 7 through 11 are diagrammatic views illustrating the positions of the shifting mechanism in the change speed and braking positions of the transmission.

In the embodiment of my invention illustrated in the drawings, a kerf cutting machine 10 is shown as having a main frame 11 supported on front rubber-tire mounted traction wheels 12, 12. The machine is also supported on rear rubber-tire mounted steering wheels (not shown) as in a companion application Serial No. 316,045, filed by me on October 21, 1952, and entitled "Combined Tramming and Steering Control," so not herein shown or described.

The kerf cutting machine 10 includes generally a turntable 15 mounted at the front of the main frame 11 and having a motor 16 trunnioned thereon on laterally spaced trunnion supports 17, 17 for vertical adjustment about the axis of said support. A cutting element (not shown) may project from said motor and may have the usual cutter chain carrying cutter bar (not shown) positionable to cut horizontal and shearing kerfs in a coal face.

The front traction wheels are shown in Figures 1 and 2 as being rotatably journalled on axles 19, 19 projecting from support bosses 20, 20 on opposite sides of the main frame 11. Each axle 19 is herein shown as having a hub 21 of the wheel 12 journalled thereon on anti-friction bearings 22, 22. A sprocket 23 may be bolted or otherwise secured to an inner flange of the hub 21, and is shown as being meshed with and driven by a drive chain 24, driven from a sprocket 25, keyed or otherwise secured to the transverse shaft 26. The transverse shaft 26 is shown as being rotatably journalled in spaced walls 34 and 28 of a transmission casing 27, mounted on the main frame 11 at one side thereof adjacent the rear end of the turntable 15.

The transmission casings 27, 27 and the change speed gearing journalled therein are each of a similar construction so one only need herein be shown and described in detail. The transmission casing 27 may be adjustably moved along the main frame 11 to maintain the chain at the required tension by means of an adjusting screw 29 threaded within an ear 30 secured to a lower recessed portion of the casing 27. Bolts 31, 31 extending through slots 32, 32 in the transmission casing are provided to secure said casing to the main frame 11 in adjusted relation with respect to the associated traction wheel 12 (see Figure 1).

Each transmission casing 27 is shown as having a fluid motor 33 secured to the inner wall 34 thereof on the outside of said wall. The motor 33 has a drive shaft 35 extending inwardly of said wall within the casing and keyed or otherwise secured to a transverse drive shaft 37, supported on said motor shaft and journalled at its end opposite said motor shaft in the wall 28 of the casing 27 on an anti-friction bearing 40. The fluid motor 33 may be of any form well known to those skilled in the art and preferably should be of a type of fluid motor which will slip when driving the inner drive wheel and the machine is turning a corner, so as to avoid the necessity of a differential drive to the two drive wheels.

The shaft 37 is herein shown as having pinion teeth 41 cut therein, adjacent the end thereof adjacent the bearing 40. The teeth 41 are shown as meshing with a spur gear 43 journalled on a transverse shaft 44 on an anti-friction bearing 45. The transverse shaft 44 is shown as being journalled in the walls 34 and 28 of transmission casing 27 on anti-friction bearings 46 and 47 respectively. One end of the shaft 44 extends outwardly from the outer wall 28 and is shown as having pinion teeth 48 cut integrally therewith. The pinion teeth 48 are shown as meshing with a spur gear 49, keyed or otherwise secured to the outer end of the transverse shaft 26. The spur gear 49 and the pinion teeth meshing therewith on the outside of the wall 28 are enclosed by a plate 50, closing the outer side portion of the transmission casing 27.

The transverse shaft 44 is driven from the spur gear 43 by means of a clutch 51, herein shown as being a well known form of friction disk clutch having the usual friction disks 53, 53, which when engaged effect a drive to the shaft 44 and a low speed drive to the transverse shaft 26 and the associated traction wheel 12.

The high speed drive to the associated traction wheel 12 is from the transverse shaft 37 through a clutch 54, which is also shown as being a friction disk clutch having the usual alternately arranged engaging friction disks 55, 55, alternate of which are internally splined to a driven clutch casing 56 journalled on its hub on the shaft 37 on a bearing 57, for driving said clutch casing when the disks are in engagement with each other. The casing 56 is shown as having a pinion 59 formed integrally with its hub and meshing with and driving a spur gear 60, keyed or otherwise secured to the end of the transverse shaft 44 adjacent the wall 34 and journalled in said wall on its hub on the anti-friction bearing 46. The high speed drive is thus through the shaft 37, clutch 54, spur pinion 59 on the hub of the casing 56, spur gear 60, shaft 44, spur pinion 48 and spur gear 49.

The clutch disks 53, 53 of the clutch 51 are shown as being engaged with each other to effect a drive from the gear 43 to the shaft 44 by means of a clutch collar 65 movable along the shaft 44 and feathered thereto and having operative engaging connection with an end disk of the disks 53 for moving said disks into engagement with each other. The engaging connection between the collar 65 and disks 53, 53 for engaging said disks with each other may be of any well known form, and is not herein shown or described since it forms no part of my present invention. A yoke 66 on a rectilinearly movable shifting member, shown as being a rod 67, slidably mounted in the walls 34 and 28 of the casing 27, is provided to shiftably move the collar 65 along the shaft 44 to engage or disengage the clutch 51. The yoke 66 is shown as being threaded on the shifting rod 67, to afford a means for adjusting the position of said yoke along said shifting rod and with respect to the clutch disks 53, 53.

The clutch 54 like the clutch 51 is engaged by operation of a collar 71, feathered on the shaft 37 and having operative engaging connection with an end disk of the disks 55, 55, to engage the same upon movement of the collar 71 toward the casing 56 and wall 34, and to accommodate said disks to be disengaged upon movement of said collar along the shaft 37 in opposite direction toward the wall 28. The collar 71 is shown as being engaged by a yoke 73 threaded on a shifting member such as a rod 74 intermediate the ends of said rod, to afford the means for adjusting the position of said yoke along said rod. The shifting rod 74 is slidably mounted in the walls 34 and 28 of the transmission casing 27 for rectilinear movement with respect thereto.

The means for shiftably moving the shifting rods 67 and 74 and the respective yokes 66 and 73, or for shifting one yoke and associated clutch and yieldably restraining movement of the other yoke to effect engagement or disengagement of one clutch while the other clutch is in an engaged or disengaged position includes a shifting bar 75 pivotally connected at its ends with the shifting rods 67 and 74. One end of the shifting bar 75 extends within the slot of a slotted outer end portion 76 of the shifting rod 67 and is pivotally connected thereto as by a vertical pivot pin 77. The opposite end of the shifting bar 75 is shown as being pivotally connected to a relatively short link 78, pivotally connected to the outer end of the rod 74 on a pivot pin 79 and affording a lost motion connection between said shifting bar and shifting rod.

The shifting bar 75 is shown as being operated by a link 80 pivotally connected thereto, intermediate the ends of said shifting bar on a pivot pin 81. The opposite end of the link 80 from the shifting bar 75 is pivotally connected to a lever arm 83. The lever arm 83 is shown as being secured to the lower end of a vertical shaft 84. The shaft 84 is pivotally mounted on the spaced outwardly extending arms of a yoke shaped bracket 85, shown as being secured to the wall 34 and extending outwardly therefrom (see Figure 3).

The shaft 84 is rocked by means of a hand lever 86 secured to the upper end thereof. The hand lever 86 is shown as extending outwardly from the shaft 84 over the top of transmission casing 27 into a convenient position for operating the clutches 51 and 53 from the side of the machine. The hand lever 86 also has a lever or crank arm 89 extending therefrom toward the rear end of the machine when looking at said hand lever from the right hand side of the machine. A transversely extending link 90 is pivotally connected to the end of the crank arm 89 at one of its ends and to a similar forwardly extending lever or crank arm 91 at its opposite end. The crank arm 91 is shown as being secured to the shaft 84 for the transmission device at the right hand side of the machine, when looking toward the forward end of the machine as shown in Figure 1 and is operated by the right hand control lever 86.

It should here be understood that the lever arms 89 and 91 connected together by the link or tie rod 90, extend in opposite directions and that the corresponding crank or lever arms 83, 83 for each transmission on each side of the machine also extend in opposite directions, to effect the simultaneous operation of the two shifting bars 75, 75 from either side of the machine upon movement of either hand lever 86 toward the front or rear of the machine. That is, when the hand lever 86 on one side of the machine is moved toward the front of the machine the opposite hand lever 86 will also move toward the front of the machine and the shifting bars 75, 75 for the transmissions 27, 27 will also move in the same shifting directions, to effect the same speed changes from either side of the machine by similar movement of either hand lever 86.

The shifting bar 67 is shown as slidably extending through the wall 28 and as having two spaced indexing or detent grooves 94 and 95 extending therearound adjacent the outer end thereof. An indexing or detent pin 96 slidably mounted in a boss portion 97 extending outwardly from the wall 28 is provided to engage either of the indexing grooves 94, 95, depending upon whether the clutch 51 is in an engaged or disengaged position. The indexing pin besides indexing the clutch in its engaged and disengaged positions also yieldably holds the shifting rod 67 from movement out of these positions. As herein shown the indexing pin 96 is slidably mounted in a chamber 99 extending along and within the boss 97 and is yieldably engaged with either detent groove by means of a compression spring 100. An adjusting screw 101 threaded in the upper end of the chamber 99 is provided to vary the loading of the spring 100 and the resistance afforded by the indexing pin 96 to shifting of the shifting rod 67.

The indexing pin 96 engaged with either of the grooves 94 or 95 affords an indexing means for the two clutches 51 and 54 and a reaction means for the shifting rod 67, yieldably holding said rod to act as a fulcrum member for the shifting bar 75 and effect shifting of the shifting rod 74 by movement of the shifting bar 75 about the axis of the pivot pin 77.

Referring now to Figures 7 through 11 illustrating the shifting operations of the shifting mechanisms for the two clutches 51 and 54, in Figure 7 the hand lever 86 is shown in its high speed position. The clutches 54, 54 for each transmission device will be engaged when the hand lever 86 is in this position and the clutches 51, 51 will be disengaged. The drive through each transmission device will then be from the shaft 37 through the clutch 54, pinion 59, gear 60, shaft 44, pinion 48 and gear 49. In this position of the hand lever 86, the indexing pin 96 will come into engagement with the detent groove 95 in the rod 67, and will yieldably hold the associated clutch 51 in a disengaged position.

Upon movement of the hand lever 86 in a clockwise direction from the high speed position shown in Figure 7 toward the neutral position shown in Figure 8, the indexing pin 96 reacting against the shifting rod 67 will yieldably hold said rod from rectilinear movement. The pressure exerted by the link 80 being inward, the shifting bar 75 will fulcrum about the pin 77 against the reaction of the indexing pin 96. This will move the shifting rod 74 and yoke 73 to the right and disengage the high speed clutch 51. Since the low speed clutch is also in its disengaged position, the transmission will be in neutral.

Further movement of the hand lever 86 in a clockwise direction from the neutral position shown in Figure 8 will pivot the shifting bar 75 about the shifting rod 74, held from further inward movement due to the fact that said shifting rod has reached the end of its inward travel. This will move the shifting rod 67 inwardly and engage the clutch 51. The indexing pin 96 will also be disengaged from the detent groove 95 and engaged with the detent groove 94 to yieldably hold the clutch 51 in its engaged position.

Low speed drive will be then effected through each transmission device through the shaft 37, gear 43, clutch 51, pinion 58 and gear 50.

Upon movement of the hand lever 86 in a counterclockwise direction from the low speed position shown in Figure 9 to that shown in Figure 10, the shifting rod 67 will be restrained from movement by the indexing pin 96 engaging the detent groove 94. The link 80 will then exert a pulling force on the shifting bar 75 and pivot said shifting bar about the axis of the pivot pin 77 on the shifting rod 67. This will rectilinearly move the shifting rod 74 to the left to engage the clutch 54. The clutch 51 already being engaged, the transmission will be locked against the clutches 51 and 54 and will be in a braking position, to hold the vehicle from movement.

Continued movement of the hand lever 86 from the position shown in Figure 10 to that shown in Figure 11 will exert a continued pull on the shifting rod 74, and will maintain the clutch 54 engaged. The shifting bar 75 will then pivot about its connection with the shifting rod 74 and disengage the indexing pin 96 with detent groove 94 and disengage the low speed clutch 51. The transmission will then be in high speed drive.

It may be seen from the foregoing that a novel and simplified form of transmission has been provided for simultaneously driving the traction wheels of vehicles from individual fluid motors at high and low speeds, which in a kerf cutting machine would be a low sumping speed sufficiently low to sump a cutter bar and its cutter bit carrying cutter chain in a coal face to initiate a cutting operation, and a higher speed for tramming the machine from working place to working place.

It may further be seen that a simple and effective form of shifting arrangement has been provided for simultaneously changing the speed of the individual transmission devices for each traction wheel which may be operated from either side of the machine, and that the transmission device and shifting mechanism therefor is so constructed and arranged as to shift to high speed when moved to one side of a neutral position and to low speed when moved to an opposite side of a neutral position and to brake the vehicle when moving in a direction from a low speed position toward a high speed position.

It may further be seen that shifting and braking is attained by the reaction of one shifting rod against the clutch shifted thereby and by the reaction of the other shifting rod against the yieldable indexing pin, accommodating both rods to be stationary during certain phases of the shifting operation, to act as fulcrum points for the shifting bar 75, depending upon whether the link 80 is moved to exert a pulling or pushing force on said shifting bar.

It will be understood that modifications and variations may be effected without departing from the scope of the novel concepts of the present invention.

I claim as my invention:

1. In a plural speed transmission, change speed means therefor comprising two oppositely movable shifting members, a single shifting bar pivotally connected with said shifting members for shifting the same, means pivotally connected with said bar between said shifting members for operatively moving said bar, and means yieldably restraining movement of one of said shifting members and reacting against said one shifting member to effect shifting movement of the other shifting member by movement of said shifting bar about said one shifting member, to effect one drive condition, and said shifting bar reacting against the other shifting member upon movement in an opposite direction to effect another drive condition.

2. In a plural speed transmission, change speed means therefor comprising two oppositely movable shifting members, each effecting a speed change upon movement in a direction opposite to the direction of the other, means yieldably restraining movement of one of said shifting members, a single shifting bar pivotally connected with both of said shifting members and extending transversely of the same, and a shifting lever operatively connected with said shifting bar intermediate its ends and exerting a pulling force thereon when moved in one direction to pivot said bar about one shifting member, and a pushing force thereon when moved in an opposite direction against the reaction of said restraining means, to pivot said bar about the other shifting member.

3. In a plural speed transmission, change speed means therefor comprising a high speed clutch and a low speed clutch and parallel rectilinearly movable shifting members for said clutches, one engaging its associated clutch when moving in one direction and the other engaging its associated clutch when moving in a direction opposite to the direction of engaging movement of said one shifting member, a shifting lever operatively connected with both of said shifting members, and yieldable restraining means engaging one of said shifting members and indexing said member in the engaged and disengaged positions of its associated clutch and also exerting sufficient resistance to movement of said shifting member to accommodate shifting movement of the other of said shifting members against the reaction exerted by said yieldable restraining means.

4. In a plural speed transmission, change speed means therefor comprising a high speed clutch and a low speed clutch, individual rectilinearly movable shifting members for shifting each of said clutches, said members moving in opposite directions to engage their associated clutches, a shifting bar pivotally connected to each of said shifting members and reacting against one of said shifting members to effect shifting of the other, a hand lever operatively connected with said shifting bar intermediate the ends thereof to selectively exert a pushing and pulling force on said shifting bar, and a spring urged indexing member engageable with one of said shifting members for indexing said shifting member in the engaged and disengaged positions of its associated clutch, said indexing member also forming a reaction means for the associated shifting member and reacting thereagainst with sufficient pressure to maintain said shifting member from movement to form a fulcrum point for said shifting bar, to shift the other of said clutches.

5. In a plural speed transmission, speed change means therefor including a high speed clutch and a low speed clutch, individual oppositely moving shifting members for each clutch, a single shifting bar for alternately shifting said shifting members, said shifting bar having pivotal connection with said shifting members and shifting one member and clutch to an engaged position when moved in one direction and reacting against the engaged clutch when moved in an opposite direction to engage the other clutch and effect a braking operation through engagement of said other clutch, and then disengaging the other clutch upon continued movement in the same direction, to effect a drive through the other clutch.

6. In a change speed control a plural speed transmission device having a high speed clutch and a low speed clutch effecting operation of the vehicle through high and low speed gear trains, a separate rectilinearly movable shifting member for shifting each of said clutches into engaged and disengaged positions, a transverse bar pivotally connecting said shifting members together, a single shifting lever operatively connected with said bar, for operating either of said clutches depending upon the direction of movement thereof, said shifting lever moving said shifting bar to fulcrum about one of said shifting members upon the exertion of a pulling force on said bar to operate the other shifting member and moving the one shifting member about the other shifting member upon the exertion of a pushing force on said bar, and yieldable indexing means for one of said shifting members, indexing said shifting member in the engaged and disengaged positions of its associated clutch and forming a reaction means for said shifting member and providing sufficient reaction thereagainst to hold the associated shifting member as a fulcrum point for said shifting bar, to effect movement of the other of said shifting members to shift its associated clutch.

7. In a change speed control, a plural speed transmission having high and low speed gear trains and high and low speed clutches controlling operation of the same, a separate shifting yoke for each clutch, a rectilinearly movable shifting member operatively connected with each yoke, a transverse shifting bar pivotally connected with said shifting members, a shifting lever for pivoting said bar about its axis of connection to either of said shifting members depending upon the direction of movement thereof, and yieldable indexing means indexing one clutch in its engaged and disengaged positions and providing sufficient reaction against the shifting member associated with said one clutch, to hold said shifting member as a fulcrum for said shifting bar to shift the other clutch.

8. In a change speed control, a plural speed transmission including high and low speed gear trains and high and low speed clutches associated with said gear trains for effecting drives therethrough, separate shifting yokes for each of said clutches, a rectilinearly movable shifting member connected with each yoke for operating the same, a shifting bar pivotally connected to said shifting members adjacent its ends and effecting shifting movement of one shifting member by pivotal movement about the other of said shifting members, an indexing member, means yieldably engaging said indexing member with one of said shifting members and indexing said shifting member and the associated clutch in its engaged and disengaged positions and also forming a reaction means for the associated shifting member, providing sufficient reaction thereagainst to hold said associated shifting member as a fulcrum for said shifting bar to shift the other of said clutches by pivotal movement about said shifting bar, a link pivotally connected with said bar intermediate its ends, and a lever pivotally connected with said link to exert a pulling or pushing force thereon and shift one or the other of said clutches.

9. In a dual transmission control two plural speed transmissions, each transmission having a high speed clutch and a low speed clutch, each transmission also having two parallel rectilinearly movable shifting members movable to effect shifting of an associated high and low speed clutch, a shifting bar for each transmission device pivotally connected between said shifting members and reacting against one of said shifting members to shift another of said shifting members, yieldable restraining means restraining rectilinear movement of one of said shifting members and providing sufficient reaction thereagainst to hold said shifting member as a fulcrum for said shifting bar, to shift the other of said shifting members, a link connected with each of said shifting bars intermediate the ends thereof, a lever arm connected with said link, and means operable for simultaneously moving said shifting bars in a selected shifting direction comprising a pivoted hand lever associated with each transmission, for pivotally moving an associated lever arm, a second lever arm operated by each hand lever, and a tie link connecting said second lever arms together to effect operation of one shifting lever upon operation of the other and simultaneously change speeds of the transmission.

10. In a dual transmission control, two plural speed transmission devices, each transmission having a high speed clutch and a low speed clutch and two parallel rectilinearly movable shifting members movable to effect shifting of the associated high and low speed clutches, a shifting bar for each transmission device pivotally connected between said shifting members and reacting against one of said shifting members to shift another of said shifting members, yieldable restraining means restraining rectilinear movement of one of said shifting members and providing sufficient reaction thereagainst to hold said shifting member as a fulcrum for said shifting bar, to shift the other of said shifting members, a link connected with each shifting bar intermediate the ends thereof, a lever arm for operating said link, and means adjacent each transmission for simultaneously moving said shifting bars in the same selected shifting directions comprising a pivoted hand lever adjacent each transmission for pivotally moving an associated lever arm, a second lever arm operated by each hand lever, said second lever arms associated with the respective transmissions extending in opposite directions, and a tie link connecting said second lever arms together, to effect the same speed change by movement of either of said hand levers in the same direction, regardless of which of said hand levers may be operated.

11. In a dual transmission control, two change speed transmission devices each transmission having a high and a low speed clutch, and means simultaneously shifting said clutches to effect a high or low speed drive comprising a separate pivoted hand lever associated with each transmission, a crank operated by each hand lever, a link connecting said cranks together to effect movement of one hand lever by movement of the other, a separate lever arm associated with each hand lever and pivotally moved thereby, a separate shifting bar operated by each lever arm, said shifting bar having pivotal connection at its ends with parallel spaced rectilinearly movable shifting members, one shifting member having operative connection with a high speed clutch for shifting the same and the other having operative connection with a low speed clutch for shifting the same, and said shifting bars each reacting against one shifting member and fulcruming about its point of connection thereto when shifting its other shifting member, to effect a speed change, and means indexing one shifting member in the engaged and disengaged positions of its associated clutch and yieldably restraining rectilinear movement of said shifting member and providing sufficient reaction against said one shifting member to hold said shifting member as a fulcrum for said shifting bar, to shift the other of said clutches.

References Cited in the file of this patent

UNITED STATES PATENTS

| | | |
|---|---|---|
| 1,036,916 | Seaman | Aug. 27, 1912 |
| 2,287,011 | Beebe | June 23, 1942 |
| 2,292,910 | Thornton | Aug. 11, 1942 |
| 2,324,542 | Schon | July 20, 1943 |
| 2,399,613 | Backus | May 7, 1946 |